J. Taylor,
Bedstead Fastening,
Nº 6.687.    Patented Sept. 4, 1849.
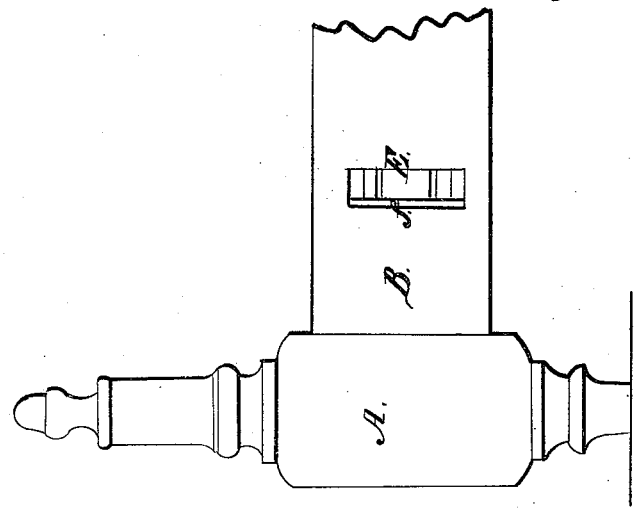
Fig. 1.
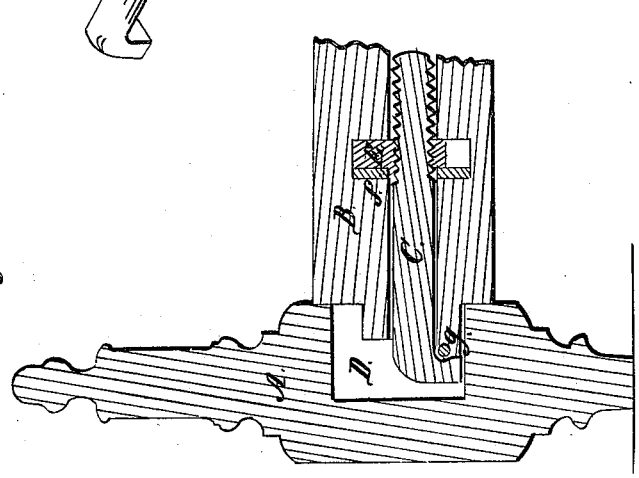
Fig. 3.
Fig. 2.
N. PETERS, PHOTO-LITHOGRAPHER, WASHINGTON, D. C.

UNITED STATES PATENT OFFICE.

JAMES TAYLOR, OF MACON, GEORGIA.

BEDSTEAD-FASTENING.

Specification of Letters Patent No. 6,687, dated September 4, 1849.

*To all whom it may concern:*

Be it known that I, JAMES TAYLOR, of Macon, in the county of Bibb and State of Georgia, have invented a new and Improved Manner of Fastening the Posts and Rails of Bedsteads to Each Other; and I do hereby declare the following to be a full, clear, and exact description thereof, reference being had to the accompanying drawings, making a part of this specification, in which—

Figure 1 is an elevation of a post (A,) and a portion of a rail (B,) connected thereto,—and Fig. 2, a vertical section thereof; Fig. 3, is a perspective view of the fastening hook (C,) and screw nut (E,) detached.

I form mortises (D,) in the posts, and tenons at the extremities of the rails, which are inserted into the mortises in the posts. The tenons at the ends of the rails, in length and depth, are less than the depth and length of the mortises in the posts, as shown in Fig. 2, but in thickness, the tenons accurately fit the width of the mortises. Through each mortise in the posts, I insert a pin $g$,—into the end of each tenon, I make a perforation—extending into the body of the rail, for the reception of the screw shank of the fastening hook C; I cut mortises into the outer sides of the rails, passing across the perforations for the reception of the screw shanks of the fastening hooks; into which mortises I insert the nuts E, which work upon the screw shanks of the fastening hooks.

The tenons at the ends of the rails, have sufficient vertical play in the mortises of the posts, to allow the fastening hooks to pass over the pins $g$; then by turning the nuts E, the hooks will draw upon the pins $g$, and will securely confine the posts and rails to each other. The weight of the rails, and whatever may be placed upon them, will rest upon the tenons at their extremities, bearing on the lower ends of the mortises in the posts. The nuts E, are circular, and have radial recesses cut into their peripheries for the reception of a screw driver for turning them;—the screw driver is inserted into the mouth of the mortises in which the nuts work.

The mortises in the outer sides of the rails,—in which the nuts E, work, may be closed by a sliding cover, or in any convenient manner to prevent the passage of bugs. The mortises in the posts, that receive the tenons of the rails, are entirely closed by the ends of the rails.

What I claim as my invention and desire to secure by Letters Patent, is—

The nuts E, for tightening and loosening the hooks C, upon the bars $g$, substantially as herein set forth.

JAMES TAYLOR.

Witnesses:
   M. D. BARNES,
   EBENEZER C. GRANNIP.